April 8, 1930.        A. BARGEBOER        1,753,678
REGULATING DEVICE
Filed Sept. 25, 1926
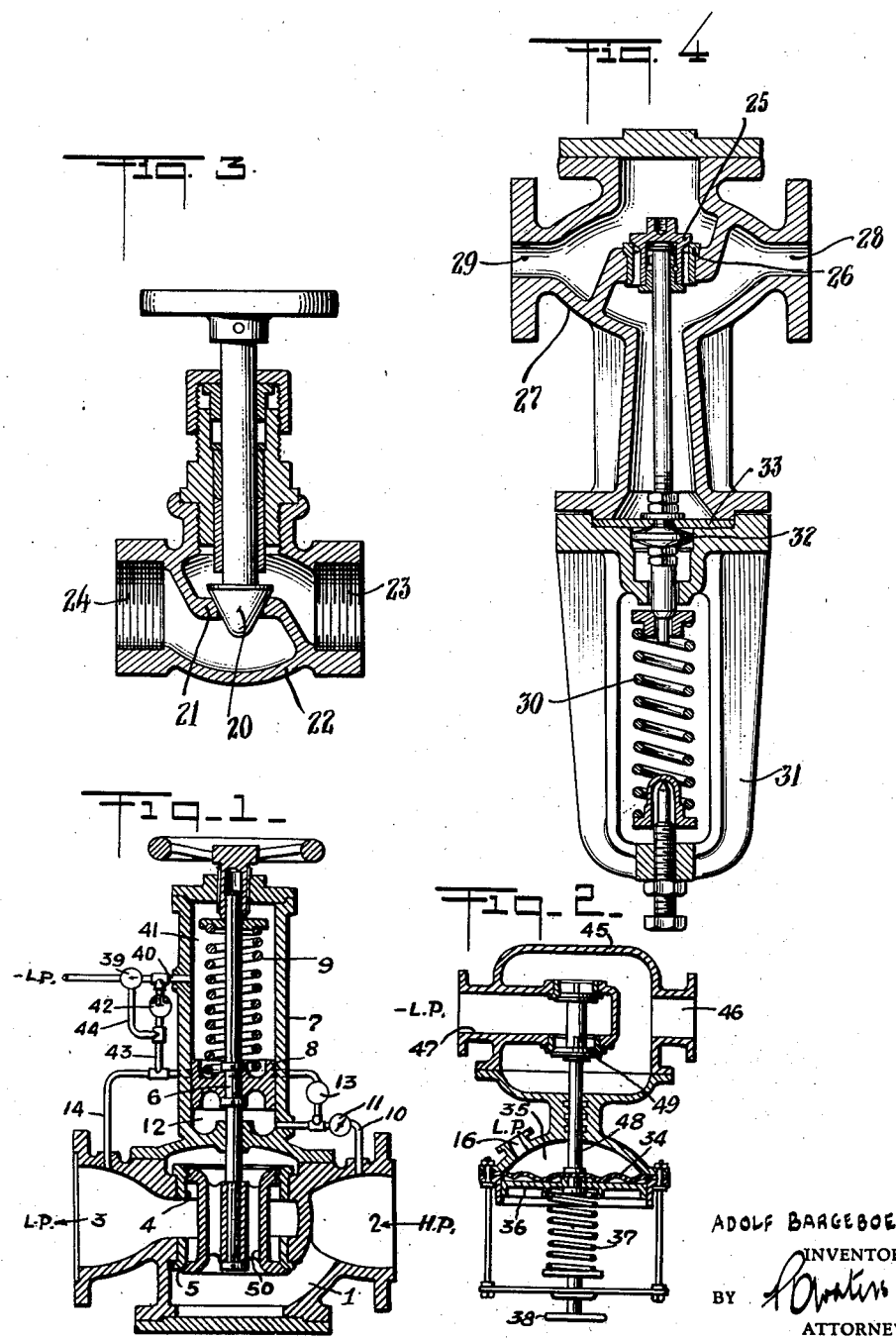
ADOLF BARGEBOER
INVENTOR
BY
ATTORNEY Patented Apr. 8, 1930

1,753,678

UNITED STATES PATENT OFFICE

ADOLF BARGEBOER, OF THE HAGUE, NETHERLANDS

REGULATING DEVICE

Application filed September 25, 1926, Serial No. 137,775, and in the Netherlands July 27, 1926.

The known pressure-regulators (pressure-reducing valves) have in general the disadvantage of a considerable and in particular of an uncertain degree of inertia, or failure to follow accurately the variations in the pressure of the medium. Attempts have been made to remove the said disadvantage by means of a pressure-regulator in which use is made of an intermediate pressure (regulating-pressure), influencing the adjustment of the main-valve. In these pressure-regulators a regulating-space is used in which the regulating pressure acts on an adjusting mechanism comprising a piston or diaphragm, in such a manner that the desired effect is obtained. A necessary condition, however, is that the difference between the high pressure and the low pressure is sufficiently large. If, however, the difference between these two pressures is small, then a sufficient regulating pressure is not available, so that the pressure regulator in the case of these small differences often does not operate at all.

The present invention has for its object to create the means allowing the pressure regulator with an adjusting piston or diaphragm to be used also in cases in which there is but a small difference between the high pressure and the low pressure.

The invention essentially consists in that the available regulating pressure variation is increased so as to correspond with the difference between the high pressure and the atmospheric pressure or, if available, a vacuum. Further, the pressures underneath and above the adjusting piston or diaphragm may be regulated separately, the pressure underneath the said piston or diaphragm then reacting on pressure variations below the adjusted pressure, the pressure above said piston or diaphragm reacting on variations above the adjusted pressure.

The invention will be more fully understood with reference to the appended claims and accompanying drawings, illustrating it by way of example.

Fig. 1 shows a pressure-regulator of the type referred to above and illustrates the manner in which its regulating-space is connected through a throttling-valve to the high pressure conduit and through a reducing-valve to the low-pressure conduit and relates at the same time to a condition in which, according to the invention, the pressure above the regulating piston is regulated by being placed in and out of communication with a chamber at a pressure less than the low pressure.

Fig. 2 is a detailed cross-sectional view of valve 39 shown in Fig. 1.

Fig. 3 is a detailed cross-sectional view of the throttling-valve 11 shown in Fig. 1.

Fig. 4 is a detailed cross-sectional view of the reducing-valve 13 shown in Fig. 1.

In the following the expressions high pressure, low pressure and regulating pressure will be indicated by H. P., L. P. and R. P. respectively.

In Fig. 1 the casing of the pressure-regulator is denoted by 1, the H. P. branch by 2 and the L. P. branch by 3. The steam passage is regulated by an equilibrium-reducing-valve 50, which is constructed at 4 as a piston and is slidable in a sleeve and adapted to close at 5 on a valve-seat. The valve 50 is mounted on a rod 6, carrying in the separate cylinder 7 an adjusting-piston 8 on which acts the adjustable pressure of a helical spring 9. The H. P. branch communicates through a conduit 10 and a throttling-valve 11 with a regulating-chamber 12 underneath the adjusting mechanism. The said regulating-space is connected to the L. P. branch by means of a reducing-valve 13 and a conduit 14.

Figure 3 illustrates in detail the throttling member 11, which in this figure is a needle valve having a valve body 20 closing against a seat 21 in a casing 22 communicating at 23 with the high pressure steam supply and at 24 with the chamber 12 in Figure 1.

Figure 4 illustrates in detail the reducing valve 13, the valve body 25 of which closes against the seat 26 in a casing 27 connected at 28 to the chamber 12 in Figure 1 and at 29 to the steam outlet 3 in Figure 1. The regulating pressure of the spring 30 in the bridge piece 31 is transmitted by means of a piston 32 to the valve 25 and tends to open the said valve in opposition to the closing force exerted by diaphragm 33. The reducing valve illustrated in Figure 4 is of such construction that its lift is dependent solely on the variation of the low pressure to be regulated.

With the apparatus as thus far described, the regulating-pressure in the regulating-chamber lies between the H. P. and the L. P. so that in the case of a small difference between H. P. and L. P. a sufficient R. P. is not available.

The auxiliary regulating-apparatus 39 with its connections and accessories diagrammatically shown in Figure 1 will now be explained with reference to Fig. 2.

The auxiliary regulating-apparatus 39 is connected by a conduit 40 to the regulating-space 41 which is above piston 8 and communicates through a non-return-valve 42 and conduit 43 and the conduit 14 with the L. P. conduit 3. Said non-return valve 42 allows a flow of steam solely in a direction from the regulating space 41 to the conduit 14, and is so adjusted that the aforementioned flow of steam takes place only when the auxiliary regulating apparatus 39 is closed. The auxiliary regulating-apparatus is operated by steam which is supplied through the conduit 44, while it is constructed as follows (Fig. 2):

The casing 45 of this apparatus forms a chamber which is connected at 46 to the regulating-pressure-space 41 above the piston. The passage of steam from 46 to a branch 47 communicating with the atmosphere or with a space or chamber (not shown), the pressure of which is lower than the reduced pressure, is determined by an equilibrium-valve 49, secured to a stem 48. The valve 49 is influenced by the pressure in the chamber 35 on the diaphragm 34 (Fig. 2) at one side and by the pressure of the spring 37 on the other side. By means of the branch 16 the chamber 35 is connected to the L. P. conduit. The operation is as follows:

If the difference between H. P. and L. P. is small, it may occur that owing thereto the closing force of the valve 50 becomes small. Then if the L. P. exceeds a predetermined limit the valve 49 will be opened and the pressure in the regulating-space 41 will be equalized more or less with that in the space to which the branch 47 is connected and consequently the reducing-valve 50 (Fig. 1) will be closed further or entirely by reason of the reduction of pressure in the space or chamber 41 and the rise of pressure in chamber 12. The non-return valve 42 prevents steam from escaping from the L. P. conduit 14 into the atmosphere of the vacuum space. Thus the pressure above the regulating-piston reacts on variations above the adjusted pressure.

In other words, there are two reducing devices, 13 and 39. When 13 is open, then 39 is closed, and 13 opens when the pressure is lower than the adjusted pressure to reduce the pressure below the piston 8, the valve 39 being closed to permit the building up of the pressure above the piston 8. When the pressure is greater than the adjusted pressure, 39 opens and 13 is then closed. Both devices 13 and 39 are closed when the corrected pressure is obtained.

As soon as valve 49 (Fig. 2) is opened, the pressure in chamber 41 will become equal to that in the vacuum space (not shown) which is connected to branch 47, and the main valve 50 will consequently be closed.

If the difference between H. P. and L. P. is small, the closing force on the valve 50 due to the pressure in the chamber 12 will be small also. When, however, the L. P. exceeds a predetermined limit the valve 13 will close and the valve 39 will be opened, so that the pressure in the regulating chamber 41 will therefore be equalized more or less with that in the chamber, to which the branch 47 is connected, and pressure will build up in the chamber 12. Consequently the main-valve 50 (Fig. 1) will be closed partially or entirely, by reason of the reduction of pressure in the chamber 41 and the rise of pressure in the chamber 12. Thus the pressure above the regulating piston reacts directly to increases of pressure on the L. P. side. If the pressure falls below the predetermined limit, the valve 39 closes to allow the pressure to build up above the piston 8 and valve 13 opens to reduce the pressure below the piston. If 13 is operating then 39 is closed and vice versa excepting when the correct pressure is attained under which conditions both the valves 13 and 39 are closed.

It will now be clear that the adjusted pressure or better the pressure to be adjusted is the low pressure at 3, further that the regulating pressures are the pressures in 41 and 42.

In the known reducing valves only a regulating pressure variation of the magnitude of the difference between H. P. and L. P. is available, whereas in the present case a regulating pressure variation of the magnitude of the difference between H. P. and atmospheric pressure and even between H. P. and the highest possible vacuum is available.

Consequently the new device is useful for various purposes and its application is not restricted to steam containers.

The throttling apparatus 11 serves for additional regulation of the throttling action of the valve 21 and needs no attendance after being accurately adjusted.

This embodiment relates to an apparatus in which the regulating-force is determined by the difference H. P.—R. P. in the other case in which the regulating-force is determined by R. P.—L. P. the apparatus according to the invention is so constructed that if H. P.—L. P. becomes small, the space above the regulating-piston is connected to the atmosphere or a vacuum in case the L. P. surpasses a predetermined limit. A non-return valve then prevents the L. P. steam from escaping to the atmosphere or the vacuum.

It will be clear that instead of valves for performing the various functions other closing elements such as slides might also be used while for actuating the valve stem 48 a spring or otherwise controlled piston might also be used.

Finally it is remarked that the non-return-valve 42 (Fig. 1) may be substituted by a throttling-valve in case the space above the regulating-piston contains L. P.-steam or throttled-H. P.-steam.

I claim:

1. A device for regulating the adjustment of the main valve of pressure-reducing valves by means of a regulating pressure, which comprises a regulating piston, a regulating chamber below the piston, a regulating chamber above the piston, and means for regulating the pressure in each regulating chamber independently of the other, the regulating pressure in one regulating chamber reacting on said regulating piston corresponding to pressure variations below the predetermined low pressure and the regulating pressure in the other regulating chamber reacting on said regulating piston corresponding to pressures above said predetermined low pressure.

2. A device according to claim 1 together with a throttling means connecting one regulating chamber with the main pressure source, a reducing apparatus communicating with the regulating chamber connected with the high pressure source for discharging said pressure, and a valve communicating the other regulating chamber to a lower pressure source, the last-mentioned valve being adapted to open when the pressure in the last-mentioned regulating chamber becomes greater than the predetermined low pressure.

In testimony whereof I affix my signature.

ADOLF BARGEBOER.